3,544,519
SULFONATED STYRENE-PHENOL RESINS
Harold George Burrows, Frederick Keith Duxbury, and Philip Brierley Ingham, Manchester, England, assignors to Imperial Chemical Industries Limited, London, England, a corporation of Great Britain
No Drawing. Filed Mar. 27, 1968, Ser. No. 716,304
Claims priority, application Great Britain, Mar. 30, 1967, 14,592/67
Int. Cl. C08g 33/10
U.S. Cl. 260—49                    1 Claim

ABSTRACT OF THE DISCLOSURE

Sulphonated styrene/phenolic resins, and the incorporation of such sulphonated resins into polyamides to improve the affinity of the polyamides for basic dyestuffs.

---

This invention relates to sulphonated resins and more particularly it relates to sulphonated styrene/phenolic resins which are valuable as additives for modifying the dyeing properties of fibre-forming synthetic linear polyamides.

According to the invention there are provided sulphonated resins comprising the sulphonic acids of styrene/phenolic resins, and the metal and ammonium salts of such sulphonic acids.

The metal salts of the said sulphonic acids are preferably the alkali metal salts, in particular the sodium and the potassium salts.

According to a further feature of the invention there is provided a process for the manufacture of the said sulphonic acids which comprises sulphonating a styrene/phenolic resin, and, if desired, converting the resulting sulphonic acid to a metal or an ammonium salt thereof.

This process of the invention can be conveniently carried out by sulphonating the styrene/phenolic resin under the conditions normally employed for sulphonating aromatic compounds, for example by heating the said resin with sulphuric acid, which optionally contains free sulphur trioxide, at temperatures between 0° and 200° C. The resulting sulphonic acid can then be isolated by conventional methods, for example by pouring the reaction mixture into a mixture of ice and water and filtering off the sulphonic acid which is precipitated. Alternatively the sulphonic acid group or groups can be introduced by treating the said resins with chlorosulphonic acid and hydrolysing the resulting sulphon-chloride group or groups.

Throughout this specification the term "styrene" denotes not only vinylbenzene but also vinyltoluenes.

The term "styrene/phenolic resins" denotes resins which are obtained by reacting styrene with phenols and ethers thereof or phenol/formaldehyde condensates and ethers thereof in the presence of suitable polymerization accelerators, for example boron trifluoride or stannic chloride.

As examples of the said phenols and ethers thereof there may be mentioned phenol, anisole, o-, m- or p-cresol, 3:5-dimethylphenol, ethoxybenzene, p-phenylphenol, α-naphthol and β-naphthol. As examples of the phenol/formaldeyde condensates there may be mentioned condensates of formaldehyde with phenol and o-, m- or p-cresol.

The proportions of styrene and the phenolic components used to prepare the said resin can be in any desired ratio; but it is preferred that they are obtained by reacting from 2 to 20 mols, of styrene with 1 mol. of the phenolic component.

Examples of styrene/phenolic resins which can be used in this process of the invention are described in British patent specification Nos. 456,359, 489,973, 516,936 and 549,303.

The resulting sulphonic acids can then be converted to the said metal and ammonium salts by conventional methods, for example by adding an appropriate amount of a metal (or ammonium) hydroxide or carbonate to an aqueous suspension of the sulphonic acid, and isolating the resulting metal or ammonium salt.

According to a further feature of the invention there is provided and alternative process for the manufacture of the sulphonic acids of styrene/phenolic resins which comprises reacting styrene with a sulphonated phenolic compound in the presence of a polymerisation accelerator.

As examples of polymerisation accelerators which may be used in the process there may be mentioned borofluoroacetic and stannic chloride.

This alternative process of the invention can be conveniently brought about by stirring the reactants together, preferably in an inert organic liquid such as benzene or carbon tetrachloride, at temperatures of up to 100° C., until the required degree of polymerisation is obtained. When the reaction is carried out in an organic liquid then the so-obtained styrene/phenolic resin which is insoluble in the medium can be filtered off. When the reaction is carried out in the absence of an inert organic liquid, then it is necessary to extract the resulting mixture with such a liquid in order to remove the accelerator from the resulting sulphonated resin.

As examples of sulphonated phenolic compounds which can be used in this process of the invention there may be mentioned 2- or 3-sulphophenol and 2- or 3-sulphoanisole. In carrying out this process of the invention it is preferred to use from 2 to 20 mols. of styrene for each mol. of the sulphonated phenolic compound. However, when it is desired to obtain resins containing a smaller proportion of sulphonic acid groups part of the sulphonated phenolic compound can be replaced by a non-sulphonated phenolic compound such as is described above.

The sulphonated styrene/phenolic resins of the invention are particularly valuable when used as intermediates in the manufacture of fibre-forming polyamides, since polyamides containing minor proportions of the said resins have reduced affinity for acid dyestuffs and an increased affinity for basic dyestuffs, and such polyamides form a further feature of the invention.

According to a further feature of the invention there are provided polyamides, having an increased affinity for basic dyestuffs and a reduced affinity for acid dyestuffs, which are obtained by polymerising a monoaminomonocarboxylic acid or an internal lactam thereof having at least two carbon atoms between the amino and carboxylic acid groups, or substantially equimolecular proportions of a diamine which contains at least two carbon atoms between the amino groups and a dicarboxylic acid which contains at least two carbon atoms between the carboxylic acid groups, in the presence of a small amount of a sulponated styrene/phenolic resin or a metal or ammonium salt thereof.

The polyamides of the present invention can be obtained under the conditions normally employed for polymerising a polymerisable monoaminomonocarboxylic acid, or a lactam thereof, or for polymerising a mixture of a diamine and a dicarboxylic acid, or for polymerising a mixture of a lactam, a diamine and a dicarboxylic acid, the said sulphonated resin being added at any stage of the polymerisation process. It is however preferred to add the said sulphonated resin during the initial stages of the polymerisation, and, above all, at the stage of charging the reactants to the polymerisation vessel. Alternatively the polyamides of the invention can be obtained by mixing the said sulphonated resin with the preformed polyamide, for example by blending the sulphonated resin with the polyamide, and preferably with the polyamide in molten form.

When starting from a substantially equimolecular proportion of a diamine and a dicarboxylic acid the said compounds can be used in the form of a salt of each other; thus, for example, hexamethylenediammonium adipate can be used instead of a mixture of equimolecular proportions of adipic acid and hexamethylenediamine. However such salts dissociate into the separate components prior to polymerisation taking place.

The process of the invention is preferably carried out at a temperature between 200° and 350° C., until the required degree of polymerisation is obtained.

The said sulphonated resins are preferably used in the form of the metal salts, in particular the sodium or potassium salts. It is also preferred to use those salts which are insoluble in water, as such salts are not readily removed from the polyamides by subsequent aqueous treatments so that the dyeability of the polyamides by basic dyestuffs is not impaired by such treatments.

The amount of the said sulphonated resin which is added to the polymerisation mixture is preferably such that the molar ratio of sulphonate groups to amine end groups present in the polyamide is at least 1.5 to 1.0.

As examples of the said polymerisable monoaminomonocarboxylic acids, or lactams thereof, there may be mentioned ε-aminocaproic acid, caprolactam, 9 - aminononanoic acid, 11-aminoundecanoic acid, dodecanolactam and enantholactam.

As examples of the said diamines there may be mentioned diamines of the general formula $H_2H(CH_2)_pNH_2$ wherein p is an integer of from 2 to 8, such as trimethylenediamine, tetramethylenediamine, pentamethylenediamine, octamethylenediamine and, above all, hexamethylenediamine.

As examples of the said dicarboxylic acids there may be mentioned isophthalic and terephthalic acids but preferably the dicarboxylic acids of the formula

HOOC.Y.COOH wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

If desired other ingredients, such as delustrants, light stabilisers, heat stabilisers and molecular weight regulators, which are commonly present in fibre-forming polyamides can be added before, during or at the end of the polymerisation stage of the present invention.

The polyamides produced by the process of the invention can be converted into fibres by any of the conventional methods of producing fibres from polymers, for example, by melt spinning. The resulting fibres have excellent affinity for basic dyestuffs and this affinity is much greater than that of fibres prepared from the corresponding polymers which were prepared in the absence of the said organic compounds.

The invention is illustrated, but not limited, by the following examples in which the parts and percentages are by weight:

EXAMPLE 1

53.2 parts of a styrene/phenol resin, which is obtained by reacting styrene and phenol together in the molar ratio of 10.8:1, are added to 92 parts of sulphuric acid, and the mixture is stirred for 2 hours at 100° C. to 110° C. The mixture is then cooled to 20° C., poured into 200 parts of water, and the precipitated sulphonic acid is filtered off, washed with water and dried.

On analysis the product is found to contain 83.3% of carbon, 7.3% of hydrogen and 3.25% of sulphur.

EXAMPLE 2

19.7 parts of the sulphonated styrene/phenol resin of Example 1 and 100 parts of water are charged to a stainless steel autoclave, followed by sufficient sodium hydroxide to convert the sulphonic acid groups to the sodium salt thereof. 262 parts of hexamethylenediammonium adipate are added, and the autoclave is then heated to 100° C. The autoclave is purged with steam, then closed, and heating is continued until a pressure of 250 pounds per sq. in. and a temperature of 220° C. is obtained. Heating is then continued until a temperature of 240° C. is obtained whilst the pressure is maintained at 250 pounds per sq. in. by a slow release of steam from the autoclave. The pressure in the autoclave is then slowly reduced to atmospheric pressure while the temperature is raised to 270° C. After 20 minutes at this temperature the polymer is discharged from the autoclave and converted by melt-spinning into fibres.

The resulting fibres have excellent affinity for basic dyestuffs (such as are described on pages 1617 to 1653 of the second edition of the Colour Index) when applied from an aqueous dyebath, and this affinity is much higher than that of fibres obtained from a polymer which was prepared by polymerising polyhexamethylenediammonium adipate in the absence of the sodium salt of the sulphonated styrene/phenol resin under the conditions described above.

EXAMPLE 3

2.46 parts of the sulphonated styrene/phenol resin of Example 1, 0.1 part of sodium hydroxide and 57 parts of polyhexamethylene adipamide in the form of chips are charged to a glass lined vessel. The vessel is then closed and the air in the vessel is replaced by nitrogen. The mixture is then stirred and heated to 290° C. in an atmosphere of steam until a homogeneous mixture is obtained.

The resulting polymer is then spun into fibres which have a much higher affinity for basic dyestuffs than fibres of the polyhexamethyleneadipamide used as starting material in this example.

EXAMPLE 4

108 parts of a styrene/phenol/anisole resin, which is obtained by reacting together styrene, phenol and anisole in the molar ratio of 10.8:0.9:0.1, are added to 184 parts of sulphuric acid, and the mixture is stirred for 2 hours at 100° to 110° C. The mixture is then cooled to 20° C., poured into 400 parts of water, and the precipitated sulphonic acid is filtered off, washed with water and dried.

On analysis the product is found to contain 82.7% of carbon, 7.4% of hydrogen and 2.8% of sulphur.

EXAMPLE 5

In place of the 19.7 parts of the sulphonated styrene/phenol resin of Example 1 which are used in Example 2, there are used 22.85 parts of the sulphonated resin of Example 4 whereby polyamide fibres which have excellent affinity for Basic Dyestuffs are also obtained.

EXAMPLE 6

13 parts of chlorosulphonic acid are added during 1 hour with stirring to a solution of 50 parts of a styrene/phenol resin (which is obtained by reacting styrene and phenol together in the molar ratio of 10.8:1) in 708 parts of methylene dichloride at 20° C., and the mixture is then stirred for 2 hours at 20° C. 1000 parts of water and 27 parts of a 32% aqueous solution of sodium hydroxide are added, and the mixture is then distilled to remove the methylene dichloride. Hydrochloric acid is added to reduce the pH of the mixture to 7, followed by 30 parts of sodium chloride, the mixture is cooled to 20° C., and the precipitated solid is filtered off, washed with water and dried. On analysis the product is found to contain 2.2% of sulphur.

EXAMPLE 7

A solution of 35.4 parts of sulphur trioxide in 142 parts of methylene dichloride is added during 2½ hours to a stirred solution of 50 parts of a styrene/phenol resin (which is obtained by reacting styrene and phenol together in the molar ratio of 10.8:1) in 668 parts of methylene dichloride at 20° C., and the mixture is then stirred for 1 hour at 20° C. 1000 parts of water and 108 parts of a 32% aqueous solution of sodium hydroxide are then added and the mixture is distilled to remove the methylene dichloride. Hydrochloric acid is added to reduce the pH of the mixture to 7, followed by 60 parts of sodium chloride, the mixture is cooled to 20° C. and the precipitated solid is filtered off, washed with water and dried. On analysis the product is found to contain 5.05% of sulphur.

EXAMPLE 8

2.5 parts of the sulphonated styrene/phenol resin of Example 6 and 100 parts of hexamethylene diammonium adipate are charged to a glass-lined vessel fitted with a stirrer, a condenser, and an inlet tube through which nitrogen is passed to displace the air in the vessel. The vessel is then heated by dimethyl phthalate vapour, and during the first 30 minutes the water evolved in the reaction is allowed to reflux, whilst during the second 30 minutes it is distilled off. The mixture is then heated for a further period of 30 minutes under the atmosphere of nitrogen, and then for a final 15 minutes at a pressure of 20 mm. of mercury. The resulting polyamide is then cooled and converted into the form of chips.

Analysis shows the polyamide to have a relative viscosity of 19.3 and to contain 42.1 amine end group equivalents and 211.2 carboxylic acid group equivalents per $10^6$ grams of polymer. When the polyamide chips are converted to fibres in known manner, the fibre has good affinity for basic dyestuffs.

EXAMPLE 9

In place of the 2.5 parts of the sulphonated styrene/phenol resin used in Example 8 there are used 6.4 parts of the same compound whereby a polyamide is obtained having a relative viscosity of 21.18 and which contains 13.55 amine end group equivalents and 258.3 carboxylic end group equivalents per $10^6$ grams of polymer.

Fibres prepared from this polyamide have excellent affinity for basic dyestuffs.

EXAMPLE 10

In place of the 2.5 parts of the sulphonated styrene/phenol resin used in Example 8 there are used 2.8 parts of the sulphonated styrene/phenol resin of Example 7 whereby a polyamide is obtained having a relative viscosity of 42.3 and which contains 15.5 amine end group equivalents and 135.1 carboxylic end group equivalents per $10^6$ grams of polymer. Fibres prepared from this polyamide have excellent affinity for basic dyestuffs.

EXAMPLE 11

In place of the 57 parts of the polyhexamethylene adipamide used in Example 3 there are used 57 parts of a polyhexamethyleneadipamide containing 2% of titanium dioxide as delustrant. The resulting fibres have a much higher affinity for basic dyestuffs than fibers of the delustred polyamide used as starting material in this example.

We claim:

1. Sulphonic acids of resins which are the condensates of from 2 to 20 mols of styrene with 1 mol of a phenolic compound selected from the class consisting of phenol and anisole, and the sodium and potassium salts of said sulphonic acids.

References Cited

UNITED STATES PATENTS

| | | | |
|---|---|---|---|
| 2,315,556 | 4/1943 | Soday | 260—619 |
| 2,636,905 | 4/1953 | Kehe et al. | 260—619 |
| 2,838,474 | 6/1958 | Meis et al. | 260—62 |
| 2,432,356 | 12/1947 | Underwood | 260—619 |
| 2,502,003 | 3/1950 | Geiger | 260—62 |
| 2,687,383 | 8/1954 | D'Alelio | 260—2.2 |

FOREIGN PATENTS

| | | |
|---|---|---|
| 918,517 | 2/1963 | Great Britain. |
| 456,359 | 11/1936 | Great Britain. |
| 489,973 | 8/1938 | Great Britain. |
| 516,936 | 1/1940 | Great Britain. |
| 549,303 | 11/1942 | Great Britain. |

WILLIAM H. SHORT, Primary Examiner

M. GOLDSTEIN, Assistant Examiner

U.S. Cl. X.R.

260—78, 512, 841, 857